United States Patent [19]
Janecke et al.

[11] Patent Number: 6,066,071
[45] Date of Patent: May 23, 2000

[54] AUTOMATED TRANSMISSION DOWNSHIFT CONTROL

[75] Inventors: Daniel P. Janecke, Kalamazoo; Thomas A. Genise, Dearborn, both of Mich.

[73] Assignee: Eaton Corporation, Cleveland, Ohio

[21] Appl. No.: 09/231,951

[22] Filed: Jan. 15, 1999

[51] Int. Cl.$^7$ .................................... F16H 61/00
[52] U.S. Cl. .............................................. 477/78
[58] Field of Search ........................ 74/335, 336 R, 74/336.5; 477/144, 148, 154, 78

[56] References Cited

U.S. PATENT DOCUMENTS

| | | |
|---|---|---|
| 4,361,060 | 11/1982 | Smyth . |
| 4,507,736 | 3/1985 | Klatt .................... 74/336 R X |
| 4,576,065 | 3/1986 | Speranza et al. ............ 477/148 X |
| 4,595,986 | 6/1986 | Dunkley et al. . |
| 4,648,290 | 3/1987 | Dunkley et al. ................. 477/78 |
| 4,850,236 | 7/1989 | Braun . |
| 4,852,006 | 7/1989 | Speranza ..................... 477/78 X |
| 4,888,577 | 12/1989 | Dunkley et al. ........... 74/DIG. 7 X |
| 4,897,790 | 1/1990 | Bieber ..................... 477/143 X |
| 4,916,979 | 4/1990 | Irwin ...................... 477/148 X |
| 4,930,078 | 5/1990 | Dunkley et al. ............. 477/144 X |
| 4,930,081 | 5/1990 | Dunkley et al. .............. 477/78 X |
| 4,947,331 | 8/1990 | Speranza . |
| 5,172,609 | 12/1992 | Nitz et al. . |
| 5,219,291 | 6/1993 | Edelen et al. . |
| 5,272,939 | 12/1993 | Markyvech . |
| 5,335,566 | 8/1994 | Genise . |
| 5,389,053 | 2/1995 | Steeby et al. . |
| 5,390,561 | 2/1995 | Stine . |
| 5,435,212 | 7/1995 | Menig . |
| 5,479,345 | 12/1995 | Amsallen . |
| 5,487,004 | 1/1996 | Amsallen . |
| 5,489,247 | 2/1996 | Markyvech . |
| 5,490,063 | 2/1996 | Genise . |
| 5,509,867 | 4/1996 | Genise . |
| 5,533,946 | 7/1996 | Markyvech . |
| 5,537,894 | 7/1996 | Chan ...................... 74/336 R X |
| 5,582,069 | 12/1996 | Genise . |
| 5,620,392 | 4/1997 | Genise . |
| 5,655,407 | 8/1997 | Dresden et al. . |
| 5,706,197 | 1/1998 | Stasik et al. ................. 74/335 X |
| 5,713,445 | 2/1998 | Davis et al. . |
| 5,737,978 | 4/1998 | Stine . |
| 5,743,143 | 4/1998 | Carpenter et al. . |
| 5,766,111 | 6/1998 | Steeby et al. . |

*Primary Examiner*—Dirk Wright
*Attorney, Agent, or Firm*—Howard D. Gordon

[57] ABSTRACT

A method/system for controlling downshifting in an automated mechanical transmission system (10) utilized on a vehicle. When a downshift from a currently engaged ratio (GR) is required (ES<ES$_{D/S}$), skip downshifts (GR$_{TARGET}$=GR−N, N>1) and then single downshifts (GR$_{TARGET}$=GR−1) are evaluated in sequence.

16 Claims, 4 Drawing Sheets

AUTOMATED TRANSMISSION DOWNSHIFT CONTROL

RELATED APPLICATIONS

This application is related to copending U.S. Ser. No. 09/232,252 titled AUTOMATED TRANSMISSION UPSHIFT CONTROL, filed Jan. 14, 1999, and assigned to EATON CORPORATION, assignee of this application.

BACKGROUND OF THE INVENTION

1. Field of the Invention

The present invention relates to a control method/system for controlling downshifting in an at least partially automated mechanical transmission system. In particular, the present invention relates to the control of downshifting in a vehicular automated mechanical transmission system wherein the system senses conditions indicative of a downshift from a currently engaged gear ratio (GR) and evaluates, in sequence, the desirability of skip downshifts and then single downshifts and commands initiation of downshifts deemed desirable.

2. Description of the Prior Art

Fully or partially automated mechanical transmission systems for vehicular use are known in the prior art, as may be seen by reference to U.S. Pat. Nos. 4,361,060; 4,648,290; 4,722,248; 4,850,236; 5,389,053; 5,487,004; 5,435,212 and 5,755,639.

Controls for automated mechanical transmission systems, especially wherein shifting is accomplished while maintaining the master clutch engaged, wherein single and/or skip shift feasibility is evaluated are known in the prior art, as may be seen by reference to U.S. Pat. Nos. 4,576,065; 4,916,979; 5,335,566; 5,425,689; 5,272,939; 5,479,345; 5,533,946; 5,582,069; 5,620,392; 5,489,247; 5,490,063 and 5,509,867, the disclosures of which are incorporated herein by reference.

SUMMARY OF THE INVENTION

The control of the present invention provides a control for a vehicular automated mechanical transmission system which will sense conditions indicative of downshifting from a currently engaged gear ratio, and will evaluate, in sequence, the desirability of large skip downshifts, then single skip downshifts, and then single downshifts, and will command a downshift to the first target ratio deemed to be desirable under current vehicle operating conditions.

The foregoing is accomplished, in a preferred embodiment of the present invention, by setting two reference engine speed values, (i) a desirable maximum engine speed ($ES_{DES}$), about 1600 to 1750 rpm for a heavy-duty vehicle diesel engine, which is selected to prevent the sensation of engine flaring after a downshift, and (ii) a maximum engine speed ($ES_{MAX}$), about 2000 to 2150 rpm for a heavy-duty vehicle, selected to be slightly below (about 50 to 100 rpm below) the governed maximum speed of the engine. The estimated engine speed at completion of skip downshifts is determined, as a function of determined vehicle acceleration/deceleration, engine acceleration and estimated time to complete a downshift. If the estimated engine speeds after a skip downshift are less than the maximum desirable engine speed ($ES_{GR-N,\ N>1} < ES_{DES}$), then a skip downshift is commanded. If skip downshifts are not feasible under the above logic, the estimated engine speed after a single downshift ($ES_{GR-1}$) is determined and compared to the maximum engine speed ($ES_{MAX}$). If $ES_{GR-1} < ES_{MAX}$, then a single downshift ($GR_{TARGET} = GR-1$) is commanded.

Accordingly, an improved downshift control for automated mechanical transmissions is provided which will automatically evaluate and command desirable skip and then single downshifts.

This and other objects and advantages of the present invention will become apparent from a reading of the following description of the preferred embodiment taken in connection with the attached drawings.

DESCRIPTION OF THE PREFERRED EMBODIMENT

Figure 1:
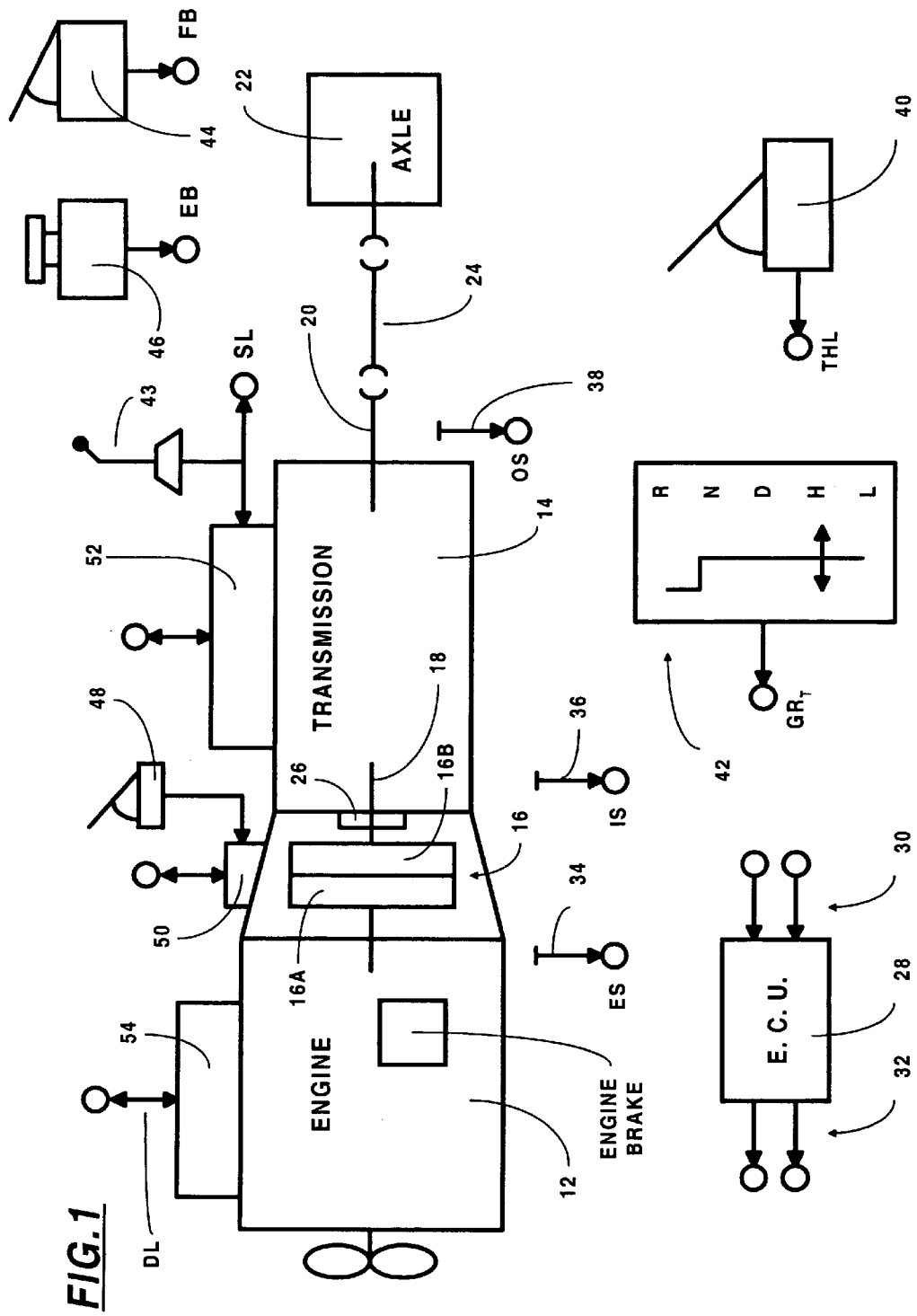
FIG. 1 is a schematic illustration, in block diagram format, of an automated mechanical transmission system utilizing the control of the present invention.

An at least partially automated mechanical transmission system intended for vehicular use is schematically illustrated in FIG. 1. The automated transmission system 10 includes a fuel-controlled engine 12 (such as a well-known diesel engine or the like), a multiple-speed, change-gear transmission 14, and a non-positive coupling 16 (such as a friction master clutch) drivingly interposed between the engine and the input shaft 18 of the transmission. Engine 12 is preferably a heavy-duty vehicle diesel engine having a governed maximum speed of about 2100 to 2200 rpm. The transmission 14 may be of the compound type comprising a main transmission section connected in series with a splitter- and/or range-type auxiliary section. Transmissions of this type, especially as used with heavy-duty vehicles, typically have 9, 10, 12, 13, 16 or 18 forward speeds. Examples of such transmissions may be seen by reference to U.S. Pat. Nos. 5,390,561 and 5,737,978, the disclosures of which are incorporated herein by reference.

A transmission output shaft 20 extends outwardly from the transmission 14 and is drivingly connected with the vehicle drive axles 22, usually by means of a prop shaft 24. The illustrated master friction clutch 16 includes a driving portion 16A connected to the engine crankshaft/flywheel and a driven portion 16B coupled to the transmission input shaft 18 and adapted to frictionally engage the driving portion 16A. An upshift brake 26 (also known as an input shaft brake or inertia brake) may be used for selectively decelerating the rotational speed of the input shaft 18 for more rapid upshifting, as is well known. Input shaft or upshift brakes are known in the prior art, as may be seen by reference to U.S. Pat. Nos. 5,655,407 and 5,713,445.

A microprocessor-based electronic control unit (or ECU) 28 is provided for receiving input signals 30 and for processing same in accordance with predetermined logic rules to issue command output signals 32 to various system actuators and the like. Microprocessor-based controllers of this type are well known, and an example thereof may be seen by reference to U.S. Pat. No. 4,595,986.

System 10 includes a rotational speed sensor 34 for sensing rotational speed of the engine and providing an output signal (ES) indicative thereof, a rotational speed sensor 36 for sensing the rotational speed of the input shaft 16 and providing an output signal (IS) indicative thereof, and a rotational speed sensor 38 for sensing the rotational speed of the output shaft 20 and providing an output signal (OS) indicative thereof. A sensor 40 may be provided for sensing the displacement of the throttle pedal and providing an output signal (THL) indicative thereof. A shift control console 42 may be provided for allowing the operator to select an operating mode of the transmission system and for providing an output signal ($GR_T$) indicative thereof.

As is known, if the clutch is engaged, the rotational speed of the engine may be determined from the speed of the input shaft and/or the speed of the output shaft and the engaged transmission ratio (ES=IS=OS*GR).

Alternatively, for systems wherein at least some of the shifting is controlled by a manual shift lever 43, a sensor may be provided for providing an input signal (SL) indicative of the position of the shift lever. Systems of this type will include systems having a manually shifted main section and an automated splitter section. Sensors of this basic type may be seen by reference to U.S. Pat. No. 5,743,143.

System 10 also may include sensors 44 and 46 for sensing operation of the vehicle foot brake (also called service brakes) and engine brakes, respectively, and for providing signals FB and EB, respectively, indicative thereof.

The master clutch 16 may be controlled by a clutch pedal 48 or by a clutch actuator 50 responding to output signals from the ECU 28. Alternatively, an actuator responsive to control output signals may be provided, which may be overridden by operation of the manual clutch pedal. In the preferred embodiment, the clutch is manually controlled and used only to launch the vehicle (see U.S. Pat. Nos. 4,850, 236; 5,272,939 and 5,425,689). The transmission 14 may include a transmission actuator 52, which responds to output signals from the ECU 28 and/or which sends input signals to the ECU 28 indicative of the selected position thereof. Shift mechanisms of this type, often of the so-called X-Y shifter type, are known in the prior art, as may be seen by reference to U.S. Pat. Nos. 5,305,240 and 5,219,391. Actuator 52 may shift the main and/or auxiliary section of transmission 14. The engaged or disengaged condition of clutch 16 may be sensed by a sensor or determined by comparing the signals ES and IS indicative to the engine and input shaft rotational speeds.

Fueling of the engine is preferably controlled by an electronic engine controller 54, which accepts command signals from and/or provides input signals to the ECU 28. Preferably, the engine controller 54 will communicate with an industry standard data link DL which conforms to well-known industry protocols such as SAE J1922, SAE1939 and/or ISO 11898. The ECU 28 may be incorporated within the engine controller 54.

As is known, for automated shifting, the ECU 28 must determine when upshifts and downshifts are required and if a single or skip shift is desirable (see U.S. Pat. Nos. 4,361,060; 4,576,065; 4,916,979 and 4,947,331).

Figure 2:
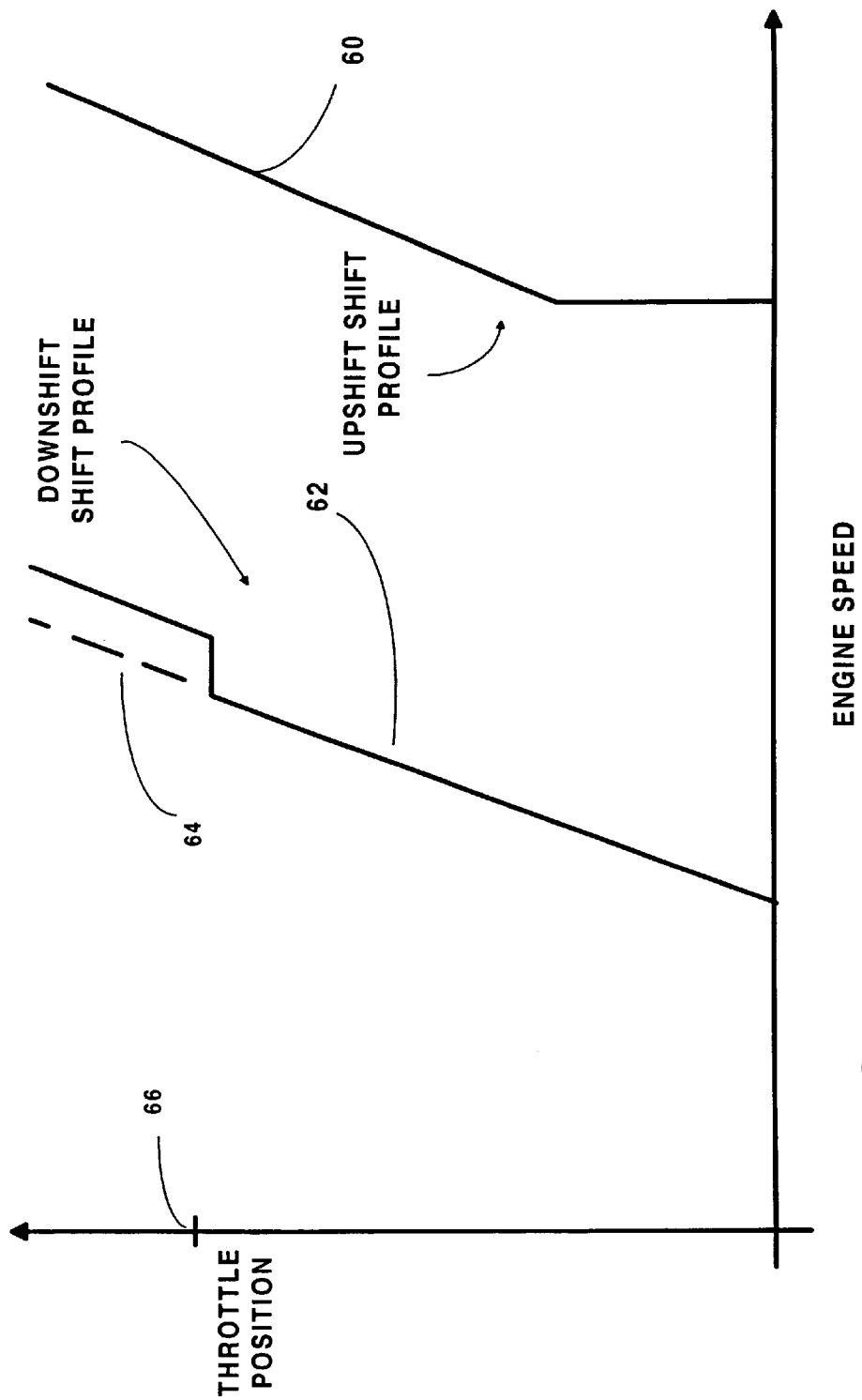
FIG. 2 is a schematic illustration, in graphical format, illustrating shift point profiles for the transmission system of FIG. 1 according to the present invention.

FIG. 2 is a graphical representation of shift point profiles utilized to determine when shift commands should be issued by the ECU 28 to the shift actuator 52. Solid line 60 is the default upshift profile, while solid line 62 is the default downshift profile. As is known, if the vehicle is operating to the right of upshift profile 60, an upshift of transmission 14 should be commanded, while if the vehicle is operating to the left of downshift profile 62, a downshift should be commanded. If the vehicle is operating in between profiles 60 and 62, no shifting of the transmission is then required.

Shift profile 62 is a graphical representation of the engine speeds ($ES_{D/S}$) at various levels of throttle position, at which a downshift from a currently engaged gear ratio (GR) into a lower ratio (GR−N, N=1, 2, 3) is indicated. In the prior art (see dashed line 64), it is known that the downshift engine speed increases with increased throttle position (i.e., increased driver demand for engine speed and torque).

In the present invention, there is a step increase in the value of $ES_{D/S}$ above a predetermined throttle displacement value 66 selected at about 80% to 100% displacement. Briefly, if THL<80%–100%, a coast downshifting condition is assumed to exist while above this value, a power downshifting condition is assumed to exist.

As is known, all or portions of shift profiles 60 and 62 are subject to movement under various operating conditions.

According to the control of the present invention, if a downshift from a currently engaged ratio (GR) is required (i.e., if at current throttle displacement engine speed (ES) is less than the downshift engine speed ($ES_{D/S}$) on shift point profile 62), a sequence is initiated for identifying the desirable downshift target ratio ($GR_{TARGET}$), if any. The control, in sequence, will evaluate multiple skip, then single skip and then single downshifts for desirability and command a downshift to the first potential target ratio deemed desirable.

Two reference engine speed values are established or set, (i) a desirable maximum engine speed ($ES_{DES}$), about 1600 to 1700 rpm for a vehicular heavy-duty diesel engine governed to about 2200 rpm, which is selected to be a speed which will not cause a sensation of engine flaring at completion of a downshift, and (ii) a maximum downshift engine speed ($ES_{MAX}$), about 2000 to 2150 rpm, selected to be slightly below (about 50 to 150 rpm below) the governed speed ($ES_{GOV}$) of the engine.

Multiple skip downshifts, then single skip downshifts, and then single downshifts are then evaluated, in sequence, and a downshift initiated from the currently engaged ratio into the first evaluated target downshift ratio deemed desirable.

According to the control logic of the present invention, in sequence:

(1) A big skip downshift from the currently engaged ratio GR into GR−3 is evaluated by estimating the expected engine speed $ES_{GR−3}$ at completion of a downshift to GR−3 and comparing that speed to the desirable maximum engine speed $ES_{DES}$. Expected engine speeds in a target ratio are estimated/determined as a function of current vehicle speed (OS), the expected acceleration/deceleration of the vehicle (dOS/dt), the expected acceleration of the engine (dES/dt) and the time expected for completion of a downshift. If $ES_{GR−3}$ is less than the maximum desirable engine speed ($ES_{GR−3}<ES_{DES}$), the downshift to GR−3 is desirable and will be initiated. If not, (2) Then a single skip downshift into GR−2 is evaluated by estimating the expected engine speed ($ES_{GR−2}$) at completion oif a downshift to GR−2 and comparing that estimated speed to the desirable maximum engine speed ($ES_{DES}$). If $ES_{GR−2}$ is less than the desirable maximum engine speed ($ES_{GR−2}<ES_{DES}$) then the downshift to GR−2 is desirable and will be initiated. If not, (3) Then a single downshift into GR−1 is evaluated by estimating the expected engine speed $ES_{GR−1}$ at completion of a downshift into GR−1 and comparing that estimated speed to the maximum downshift engine speed ($ES_{MAX}$). If ES GR−1 is less than the maximum downshift engine speed ($ES_{GR−1}<ES_{MAX}$), then a single downshift from the currently engaged ratio (GR) into GR−1 is desirable and will be commanded. If not, (4) No downshift will be commanded.

Figure 3A:
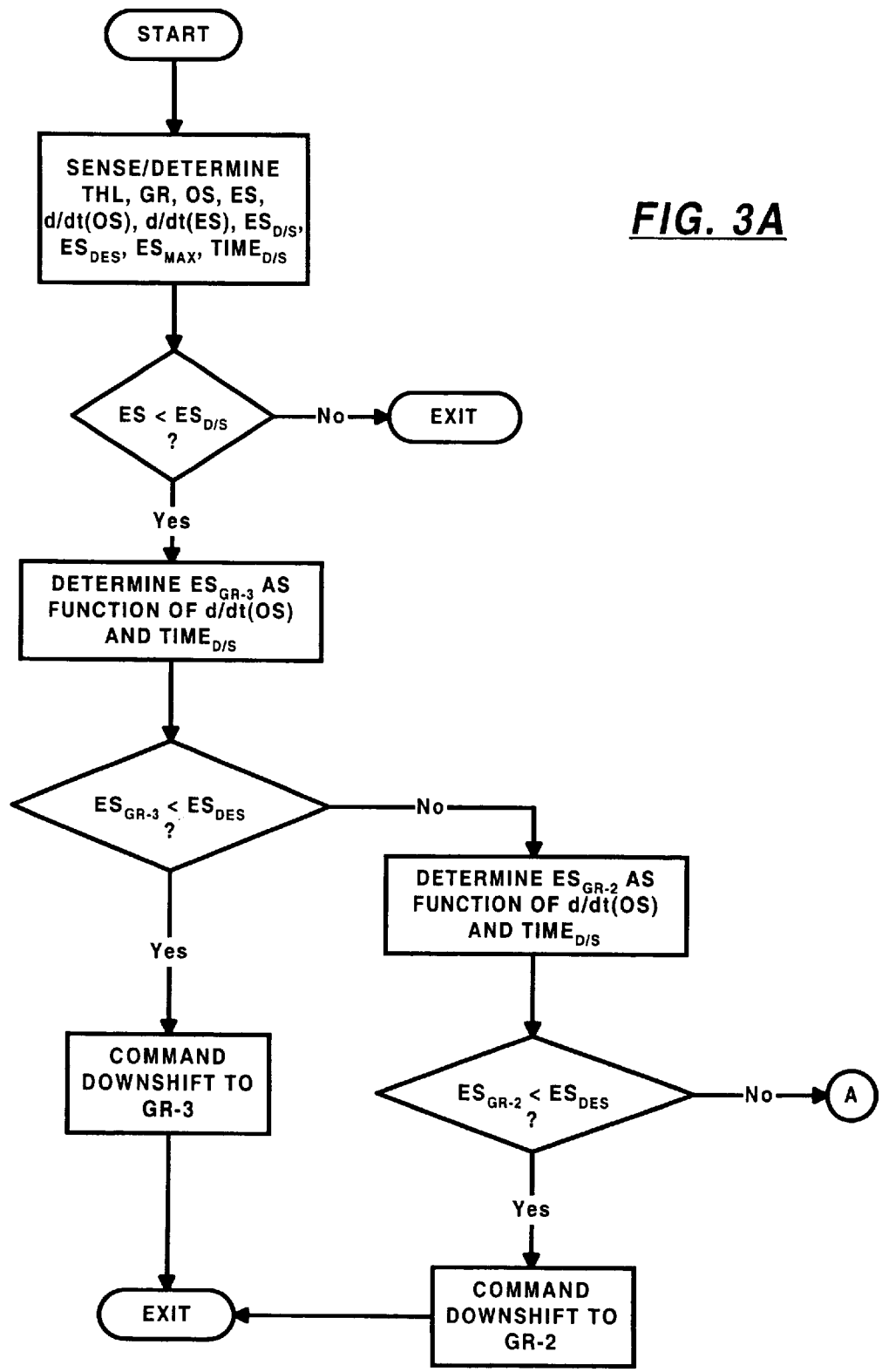
FIGS. 3A and 3B are schematic illustrations, in flow chart format, of the control of the present invention.
Figure 3B:
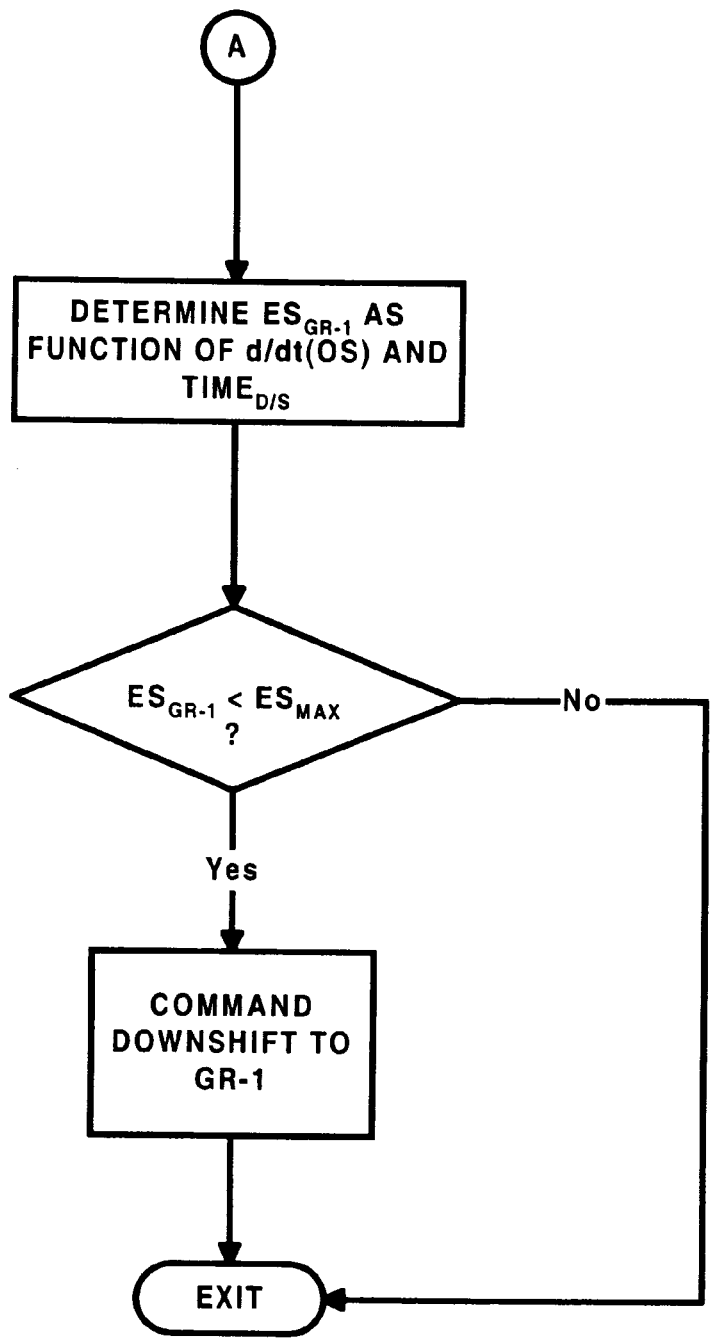

The control of the present invention is shown in flow chart format in FIGS. 3A and 3B. Although only skip shifts of two ratio steps are illustrated, the present invention also is applicable to skip shifts of three or more ratios.

The time and/or rate of engine acceleration (dES/dt) used to determine an estimated engine speed after a downshift ($ES_{GR-N}$) may be empirically determined constants or may be calculated or learned values.

To complete a downshift from GR to GR–N, the engine speed must be modulated to a zero driveline torque value (see U.S. Pat. No. 4,850,236), the transmission must be shifted into neutral, the engine must be accelerated to a substantially synchronous speed for the new ratio ($ES_{GR-N} \approx OS_{EXPECTED} * GR_{TARGET}$), and then the transmission must be shifted from neutral into the appropriate ratio.

Accordingly, it may be seen that an improved control system/method for controlling downshifting in an at least partially automated mechanical transmission system in a vehicle is provided.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. A method for controlling automatic downshifting in a vehicular automated mechanical transmission system (10) for a vehicle comprising a fuel-controlled engine (12), a multiple-speed mechanical transmission (14), and a controller (28) for receiving input signals (30) including one or more of signals indicative of engine speed (ES), engaged gear ratio (GR) and vehicle speed (OS), and for processing said input signals in accordance with logic rules to issue command output signals (32) to transmission system actuators including a transmission actuator (52) effective to shift said transmission, said method including the steps of:

(a) determining, as a function of throttle position, a downshift engine speed ($ES_{D/S}$) at which an automatic downshift from a currently engaged ratio (GR) is indicated;

(b) comparing engine speed (ES) to the downshift engine speed;

(c) determining a first engine speed reference value ($ES_{DES}$) and a second engine speed reference value ($ES_{MAX}$), said second engine speed reference value greater than said first engine speed reference value ($ES_{MAX} > ES_{DES}$); and (d) if said automatic downshift from the currently engaged ratio (GR) is indicated ($ES < ES_{D/S}$), in sequence:

(i) determining if a skip downshift of two ratios from the currently engaged ratio ($GR_{TARGET} = GR-2$) is desirable by determining a first expected engine speed at completion of said skip downshift of two ratios ($ES_{GR-2}$), comparing said first estimated engine speed to said first reference value, deeming said skip downshift of two ratios desirable if said first estimated engine speed is less than said first reference value ($ES_{(GR-2)} < ES_{DES}$) and commanding said skip downshift of two ratios if deemed desirable; if not, (ii) then determining if a downshift of one ratio from the currently engaged ratio ($GR_{TARGET} = GR-1$) is desirable by determining a second expected engine speed at completion of said downshift of one ratio ($ES_{GR-1}$), comparing said second estimated engine speed to said second reference value, deeming said downshift of one ratio desirable if said estimated speed is less than said second reference value ($ES_{(GR-1)} < ES_{MAX}$) and commanding said downshift of one ratio if deemed desirable; if not, (iii) then retaining the transmission in the currently engaged ratio.

2. The method of claim 1 comprising the further step, prior to step (i), of (iv) determining if a skip downshift of three ratios from the currently engaged ratio ($GR_{TARGET} = GR-3$) is desirable by determining a third expected engine speed at completion of said skip downshift of three ratios ($ES_{GR-3}$), comparing said third estimated engine speed to said first reference value, deeming said skip downshift of three ratios desirable if said third estimated engine speed is less than said first reference value ($ES_{(GR-3)} < ES_{DES}$) and commanding said skip downshift of three ratios if deemed desirable; if not, proceeding to step (i).

3. The method of claim 1 wherein said engine is governed to a maximum engine speed ($ES_{GOV}$) and said second reference value ($ES_{MAX}$) is a function of said maximum engine speed ($ES_{GOV}$).

4. The method of claim 3 wherein said second reference value is about 50 to 150 rpm less than said maximum engine speed.

5. The method of claim 1 wherein said expected engine speeds after a downshift ($ES_{GR-2}$, $ES_{GR-1}$) are determined as a function of one or more of an estimated time to complete downshifts, estimated engine acceleration (dES/dt) and estimated vehicle deceleration.

6. The method of claim 3 wherein said engine is a vehicle diesel engine and is governed to a maximum speed of about 2100 to 2200 rpm, said first engine speed reference value is about 1600 to 1700 rpm, and said second engine speed reference value is about 1950 to 2150 rpm.

7. The method of claim 5 wherein said expected engine speeds are determined as a function of estimated time, which is an empirically determined constant.

8. The method of claim 1 wherein the downshift engine speed ($ES_{D/S}$) above a selected throttle displacement value (66) is at least 20% greater than the downshift engine speeds ($ES_{D/S}$) below the selected displacement value.

9. The method of claim 8 wherein said displacement value is about 80% to 99% of full throttle displacement.

10. A control system for controlling automatic downshifting in a vehicular automated mechanical transmission system (10) for a vehicle comprising a fuel-controlled engine (12), a multiple-speed mechanical transmission (14), and a controller (28) for receiving input signals (30) including one or more of signals indicative of engine speed (ES), engaged gear ratio (GR) and vehicle speed (OS), and for processing said input signals in accordance with logic rules to issue command output signals (32) to transmission system actuators including a transmission actuator (52) effective to shift said transmission, said control system including logic rules for:

(a) determining, as a function of throttle position, a downshift engine speed ($ES_{D/S}$) at which an automatic downshift from a currently engaged ratio (GR) is indicated;

(b) comparing engine speed (ES) to the downshift engine speed;

(c) determining a first engine speed reference value ($ES_{DES}$) and a second engine speed reference value ($ES_{MAX}$), said second engine speed reference value greater than said first engine speed reference value ($ES_{MAX} > ES_{DES}$); and (d) if said downshift from said currently engaged ratio (GR) is indicated ($ES < ES_{D/S}$), in sequence:
(i) determining if a skip downshift of two ratios from the currently engaged ratio ($GR_{TARGET} = GR-2$) is desirable by determining a first expected engine speed at completion of said skip downshift of two ratios ($ES_{GR-2}$), comparing said first estimated engine speed to said first reference value, deeming said skip downshift of two ratios desirable if said first estimated engine speed is less than said first reference value ($ES_{(GR-2)} < ES_{DES}$) and commanding said skip downshift of two ratios if deemed desirable; if not,
(ii) then determining if a downshift of one ratio from the currently engaged ratio ($GR_{TARGET} = GR-1$) is desirable by determining a second expected engine speed at completion of said downshift of one ratio ($ES_{GR-1}$), comparing said second estimated engine speed to said second reference value, deeming said downshift of one ratio desirable if said second estimated engine speed is less than said second reference value ($ES_{(GR-1)} < ES_{MAX}$) and commanding said downshift of one ratio if deemed desirable; if not,
(iii) then retaining the transmission in the currently engaged ratio.

11. The control system of claim 10 wherein said logic rules are further effective, prior to step (i), for:

(iv) determining if a skip downshift of three ratios from the currently engaged ratio ($GR_{TARGET} = GR-3$) is desirable by determining a third expected engine speed at completion of said skip downshift of three ratios ($ES_{GR-3}$), comparing said third estimated engine speed to said first reference value, deeming said skip downshift of three ratios desirable if said third estimated engine speed is less than said first reference value ($ES_{(GR-3)} < ES_{DES}$) and commanding said skip downshift of three ratios if deemed desirable; if not, proceeding to step (i).

12. The control system of claim 10 wherein said engine is governed to a maximum engine speed ($ES_{GOV}$) and said reference value ($ES_{MAX}$) is a function of said maximum engine speed ($ES_{GOV}$).

13. The control system of claim 12 wherein said second reference value is about 50 to 150 rpm less than said maximum engine speed.

14. The control system of claim 12 wherein said engine is a heavy-duty vehicle diesel engine and is governed to a maximum speed of about 2100 to 2200 rpm, said first engine speed reference value is about 1600 to 1700 rpm, and said second engine speed reference value is about 1950 to 2150 rpm.

15. The control system of claim 10 wherein the downshift engine speed ($ES_{D/S}$) above a selected throttle displacement value (66) is at least 20% greater than the downshift engine speeds ($ES_{D/S}$) below the selected displacement value.

16. The control system of claim 15 wherein said displacement value is about 80% to 99% of full throttle displacement.

* * * * *